(12) United States Patent
Furnas

(10) Patent No.: US 7,162,026 B2
(45) Date of Patent: Jan. 9, 2007

(54) ALERT MUTING METHOD THROUGH INDIRECT CONTACT FOR PORTABLE DEVICES

(76) Inventor: William J Furnas, 915 Walnut St., Elmira, NY (US) 14901

( * ) Notice: Subject to any disclaimer, the term of this patent is extended or adjusted under 35 U.S.C. 154(b) by 371 days.

(21) Appl. No.: 10/626,996

(22) Filed: Jul. 25, 2003

(65) Prior Publication Data

US 2005/0018834 A1    Jan. 27, 2005

(51) Int. Cl.
*H04M 1/00* (2006.01)
*H04M 3/00* (2006.01)

(52) U.S. Cl. .......................... 379/376.02; 379/373.01; 379/421; 379/422

(58) Field of Classification Search ................ 379/421, 379/372, 373.02, 376.02, 422
See application file for complete search history.

(56) References Cited

U.S. PATENT DOCUMENTS

| | | | | |
|---|---|---|---|---|
| 4,017,683 A | * | 4/1977 | Pederson et al. | 375/369 |
| 5,995,852 A | * | 11/1999 | Yasuda et al. | 455/567 |
| 6,400,814 B1 | * | 6/2002 | Adams | 379/142.01 |
| 6,594,354 B1 | * | 7/2003 | Kelly | 379/201.1 |
| 2003/0092428 A1 | * | 5/2003 | Awada et al. | 455/414 |
| 2004/0161101 A1 | * | 8/2004 | Yiu et al. | 379/406.01 |

* cited by examiner

*Primary Examiner*—Fan Tsang
*Assistant Examiner*—Ramnandan Singh
(74) *Attorney, Agent, or Firm*—Spencer T. Smith

(57) ABSTRACT

The invention generally relates to a method for muting an alerting portable device such as a ringing cell phone or alarming PDA. Specifically where muting is activated in a means not requiring direct contact with the keys of the device. The indirect contact such as a hand pat or smack is detected within the device by a sensor such as a microphone or accelerometer. Control circuitry detects active indirect contact and then mutes the alert, and or does some other programmable operation.

8 Claims, 5 Drawing Sheets

ALERT MUTING METHOD THROUGH INDIRECT CONTACT FOR PORTABLE DEVICES

CROSS-REFERENCE TO RALATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PGM LISTING CD APPENDIX

Not Applicable

BACKGROUND OF THE INVENTION

The invention generally relates to a method for muting an alerting portable device such as a ringing cell phone or alarming PDA. Specifically where muting is activated in a means not requiring direct contact with the keys of the device.

DESCRIPTION OF THE RELATED ART

Portable communication devices, such as cellular telephones, actively receive calls while the user in a wide range of situations. Users often have the ringers set on high to insure that they will hear the ringer. In fact, U.S. Pat. No. 6,246,761 is to help insure that the ringer is heard. Once a user has heard the ringer, further ringing is an annoyance to the receiver and surrounding people. While retrieving the phone from it's storage place, the ringing continues and often sounds louder as it is retrieved from a pocket or purse. What the user needs is an effective way to silence the ring until they can retrieve the phone from its storage place.

Method of muting a by an impulse made indirectly or directly to the device. An impulse such as tapping or patting the device, even if in a pocket or handbag would stop the audible alert. In a portable telephone, the impulse could be detected either by the microphone element already in the phone, or an added accelerometer type sensor.

United States Patent Application 20020028674—Describes a politeness zone that will silence ringers on cellular phones. This shows that people are concerned with controlling the ringing in different situations.

U.S. Pat. No. 6,463,278—Describes automatic mode changing based upon time/calendar, attached peripherals, light conditions. None of these involve the user in the ring silencing process.

U.S. Pat. No. 6,456,696—Describes a method for deactivating a call indicator via a keypad or a menu. This describes various schemes for handling and screening calls but with muting the ringer with a key or menu on the phone, so the user must still gain full access to the phone to activate the ringer mute.

U.S. Pat. No. 6,408,187—Describes determining the behavior of a communications device based upon environmental conditions. The detected environmental conditions set the state of the phone. They are not used for user interaction with the phone in the process of receiving calls.

U.S. Pat. No. 6,400,814—Describes a ringer silencer system, used for call screening. This provides for silencing the ring with the keys on the keypad and also for using the keys to direct the call or caller. The user still has to gain access to the phone to access the silencing feature.

U.S. Pat. No. 6,397,085—Describes a key click volume control. This is based upon the state of the phones interaction within a vehicle mount.

U.S. Pat. No. 6,347,133—Describes using timer control for varying the number of rings and ringer volume. The user can program and select which of various ring settings to use with keys. There is no user interaction as a call is being received affecting the ringing.

U.S. Pat. No. 6,330,457—Describes sensing that a user is holding the hand held phone with temperature, pressure, fingerprint or scanning beam. All of these require the user to come in direct contact with the phone.

U.S. Pat. No. 6,252,516—Describes a sequential ringing system from silent to audible, and changing to fully audible alert when it is coupled to an accessory, (such as a power supply). There is no user interaction with the phone at all.

U.S. Pat. No. 6,246,761—Describes a ringer system designed to insure that it will be heard. This senses the ambient noise surrounding the phone in a way to insure that the user will be able to hear the phone. There is no user interaction in this system to further affect the ringing volume of an incoming call. Is does provide an example of sensing the environment beyond direct contact with the phone.

U.S. Pat. No. 6,240,176—Describes a silent ringer. This is a vibrator to alert the user. This also demonstrated the concern for a system that minimizes the unexpected sounds from portable communications devices.

U.S. Pat. No. 6,018,671—Describes a answering selection similar to putting the caller on hold with a message that the call will be answered shortly. This has the alert system already silent and provides one scheme for dealing with the call after the user is aware that a call is being received and the user has gained access to the phone.

U.S. Pat. No. 6,002,763—Describes a ringing mute system which is activated while a user is preparing (dialing) for a call they are initiating. This does not deal with silencing an ring for an incoming call in other situations based upon a users actions after the incoming call alert has started.

U.S. Pat. No. 5,930,351—Describes a remote control for a telephone ringer. This is an in line device for wired telephones.

U.S. Pat. No. 5,812,648—Describes a ringing system that can be deactivated for a time, with remote control. It also provides for a caller or caller ID to override the deactivated ringer. The user does not have control for an individual call.

U.S. Pat. No. 5,687,227—Describes allowing the user to record ringing signals. This permits distinctive ringing signals. Still does not provide for muting the alert.

U.S. Pat. No. 5,642,413—Describes selectable alert modes, with a switch for enabling a vibration mode of call annunciation. In this case the selection is made with direct contact with a switch on the phone.

U.S. Pat. No. 5,604,797—Describes a gate system for silencing a ringer for a time. The silencing system is set by the user for a time, and allows for a caller to override the muting.

U.S. Pat. No. 5,317,632 to Ellison, provide a means for silencing a ringer for a user-determined time period during which a user does not wish to be disturbed. This is just a timer controlled switch system.

SUMMARY OF THE INVENTION

A cell phone or personal digital assistant (PDA) in a pocket, handbag or briefcase is not easily accessible to press the key required to silence the ringer. Once the user is aware that they need to gain access to the device to determine how to respond to the alert the actual audible annunciation is no longer needed. Yet the user can not silence it. Additionally, the act of removing the device from the pocket or bag usually means that those around get to hear the alert even louder as it is removed. The continued sounding of the alert is often an annoyance to those around the user and an embarrassment to the user.

The present invention allows the user to acknowledge the annunciation through indirect contact.

Such as when the phone or PDA is in the users pocket, simple patting the phone through the clothing would stop the alert, then they can remove device from their pocket while it is silent.

When the alerting device is in a handbag, the act of jostling, or poking at the handbag would stop the alert.

When the device is in a brief case, the act of thumping on the case would stop the alert.

There may be times when the device is already in a moving environment. To avoid inadvertent silencing, the environment would be measured. Once the alert has been activated, a user-initiated change in the previously measured environment would then be detectable. So a device being jostled in a handbag, as a user is walking, would not be silenced until some significantly different motion is detected, it may be either the stopping of the jostling because the user is about to retrieve the phone from the bag, or an additional poke at the handbag, or some other signal processing analysis of the sensor.

DETAILED DESCRIPTION OF THE INVENTION

While in this detailed description the devices discussed include portable telephones to simplify the illustration of the invention. It is to be understood that this applies to any device that would need to signal the user.

Figure 1:
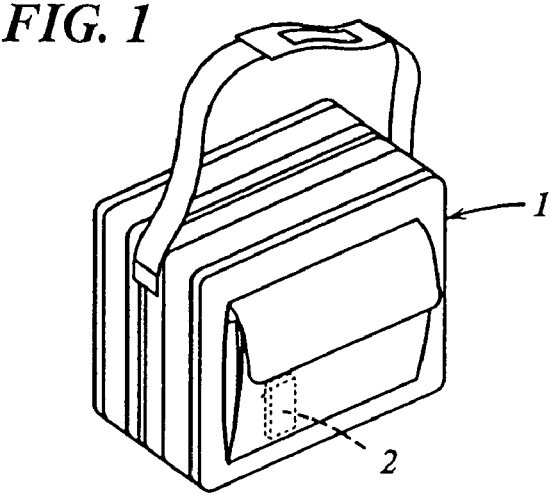
FIG. 1 shows a device in a typical computer bag.

Devices such as cell phones and PDAs are kept with the user. Often while they are with the user they are not actually held in their hands with immediate access to the controls of the device. When a phone 2 carried in a computer style bag 1 begins to ring (FIG. 1), it is often muffled while it is the bag, to silence the ringer, the user must open the bag, often with the tearing sound of hook loop fastener, remove the phone, and now the ringing sound is louder. It must then be handled to gain access to the controls to silence the ring.

Figure 2:
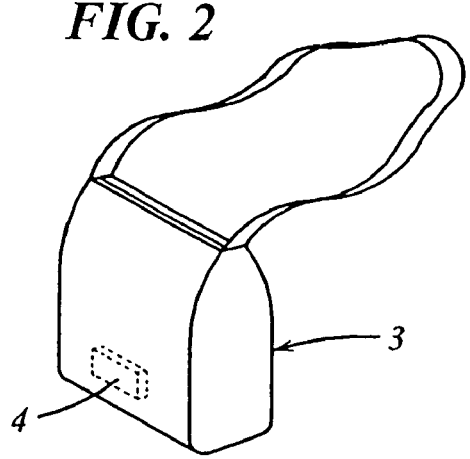
FIG. 2 shows a device in a handbag.
Figure 3:
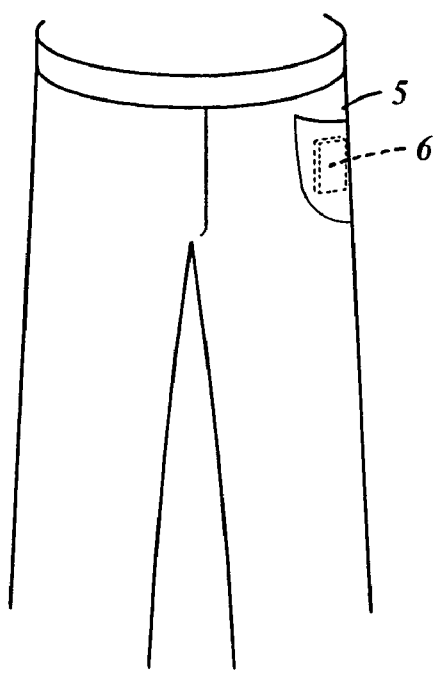
FIG. 3 shows a device in a pocket.
Figure 4:
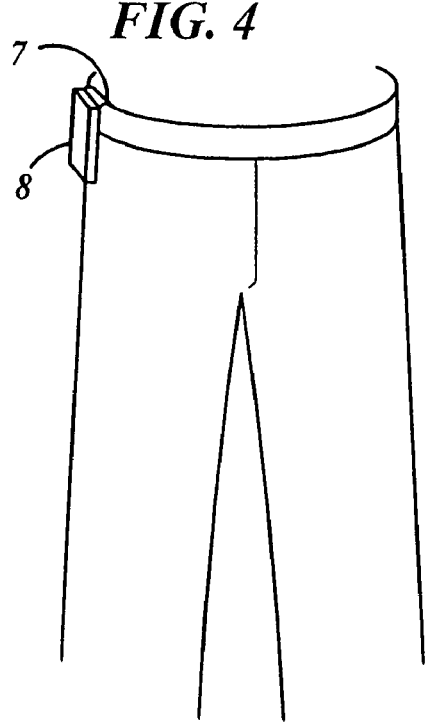
FIG. 4 shows a device hanging from a belt.

Similarly if the phone 4 was in a handbag 4 (FIG. 2), or the phone 6 was in the pocket of their clothing 5 (FIG. 3). Belt clip devices 7 for a phone 8 (FIG. 4) greatly improve the speed at which the user can gain access to the ringer silencer, but still explicit handling to active the specific control on the phone is required.

Figure 5:
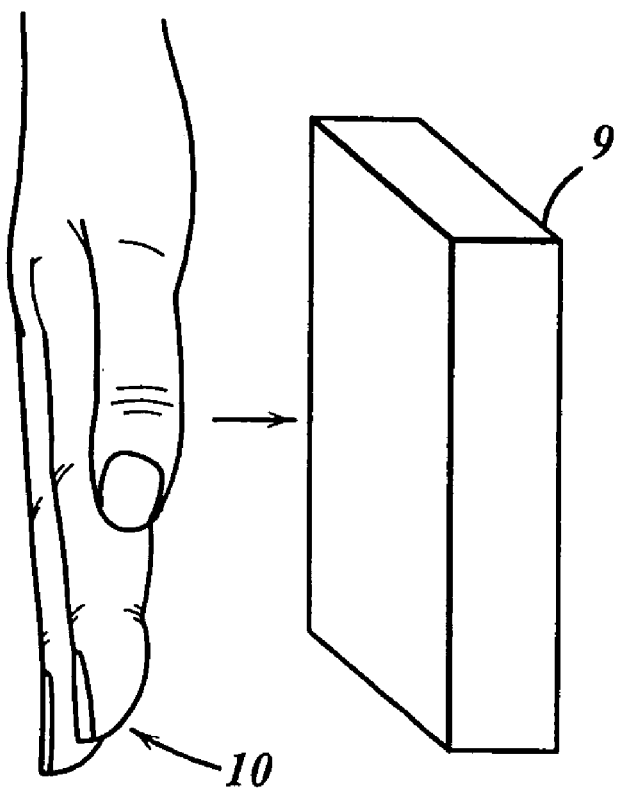
FIG. 5 shows an impact being applied to a device.
Figure 6:
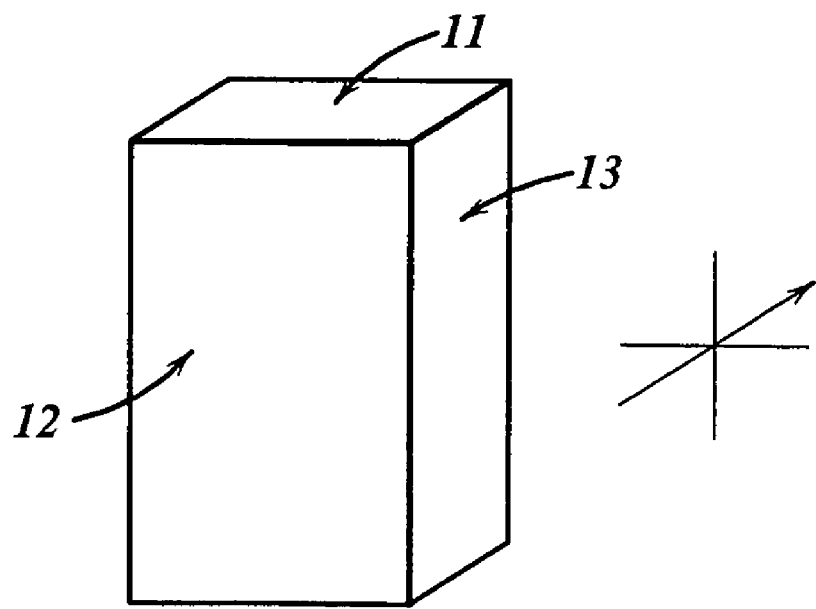
FIG. 6 shows the likely predominant axis of sensitivity.

A simple action of a hand 10 pat against the phone 9 indirectly or directly could activate the ringer muting within the phone. The hand pat (slap, smack) on the phone (FIG. 5) can be detected through the material or even in the way the phone is intentionally jostled within the a handbag or briefcase. Given the generally flat rectangular form factor of devices, there is a major axis perpendicular to the largest face 12 (FIG. 6) and two minor axis perpendicular to the smaller area faces 11,13. Because of how the phone would be residing in a pocket or handbag, it is likely that the axis perpendicular to face 12 should be the most sensitive for muting the ringer.

Figure 7:
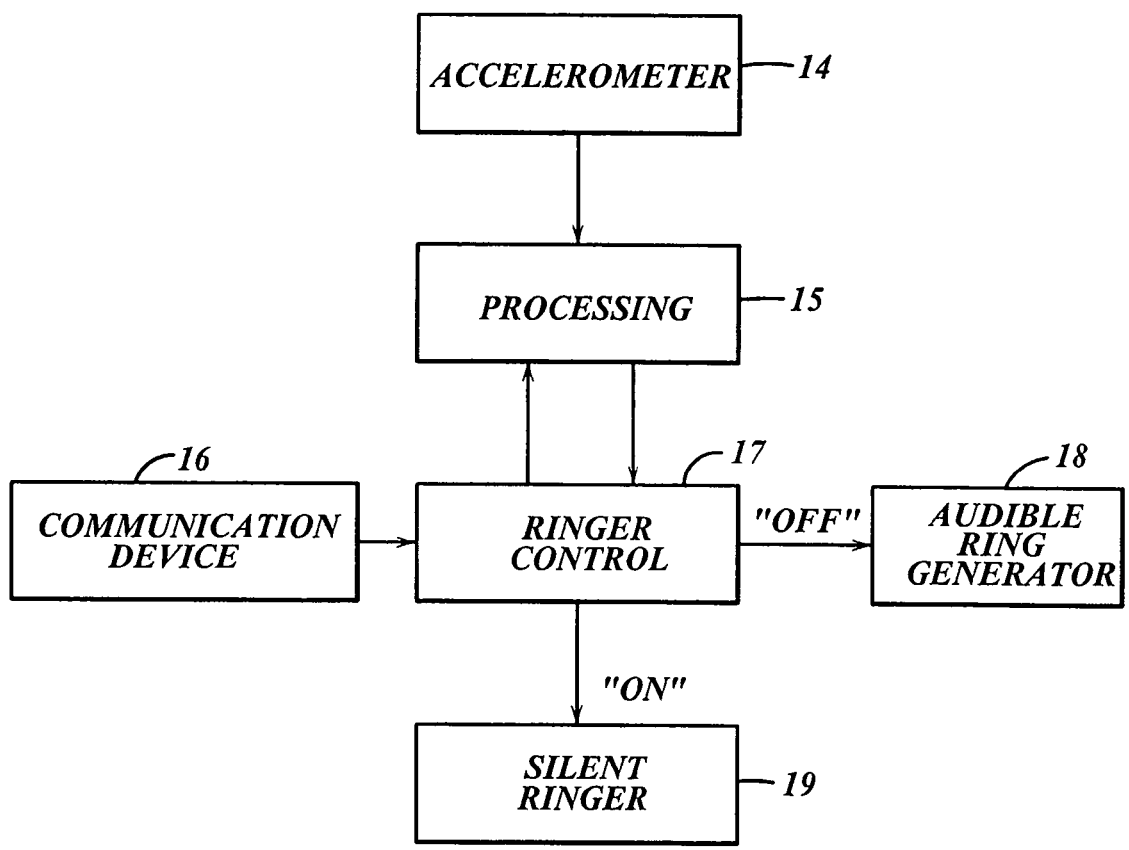
FIG. 7 shows a ringer control system augmented with additional accelerometer input control.

An Accelerometer 14 (FIG. 7) could be added to the device oriented in this manner to optimize sensitivity. This does not preclude in the scope of this invention the use a multiplicity of sensors. The accelerometer 14 signal would be subjected to processing 15. The processing would interact with the actual Ringer Control 17 signaled by the Communication Device 16 to disable the Audible Ringer 18 and, according to the ringer control options affect the operation of the Silent Ringer 19, possibly enabling it as an alternate to the audible ringer, or disabling both.

Figure 8:
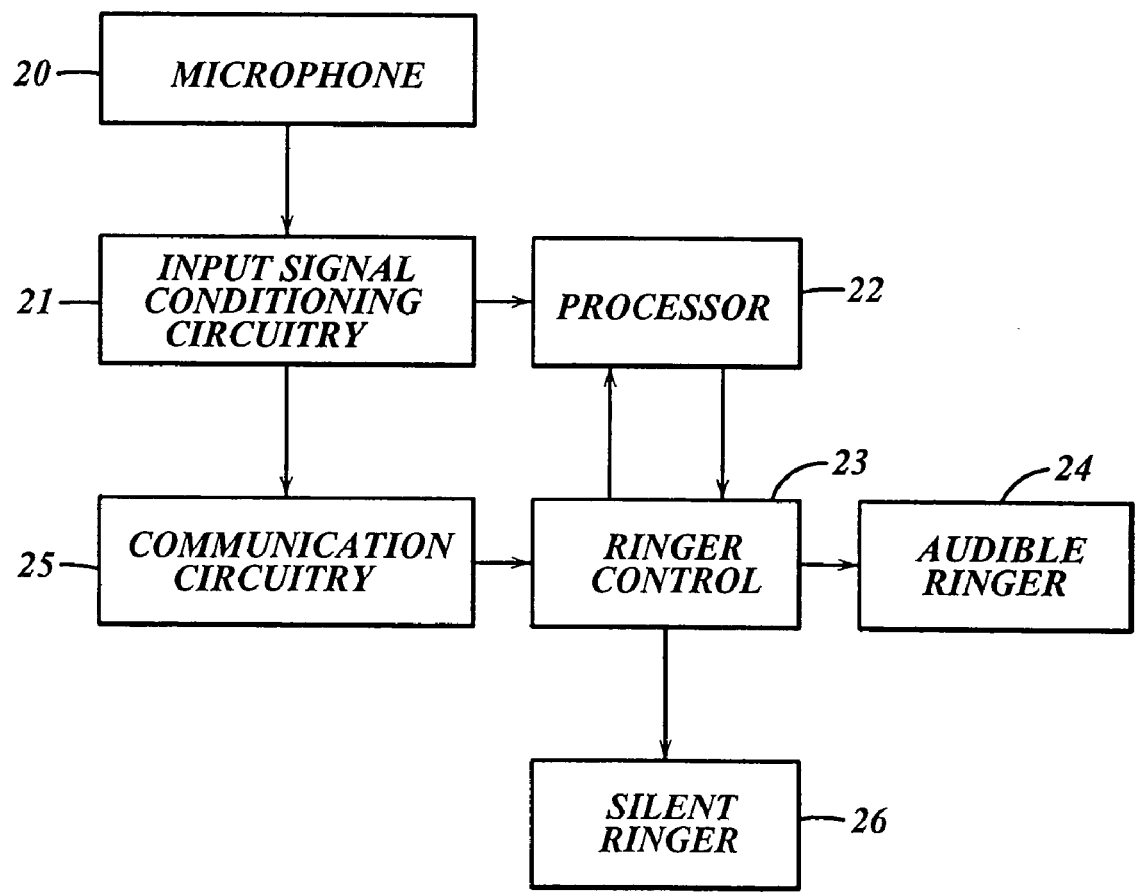
FIG. 8 shows a microphone input circuit used both as a microphone and for ringer control.

Another way to detect the users indirect contact with the phone is to use a microphone already built into the phone. Many PDA devices now also include microphone for recording so this can be applied to them too. When a Microphone 20 (FIG. 8) is in a device there is likely Input Signal Conditioning Circuitry 21 in place to feed typical Communications Circuitry 25. A signal from the microphone or conditioning circuit is fed to a Processor 22 to detect the users manual signal against the phone. The processing signals the Ringer Control 23 to shut down the Audible Ringer 24 which would optionally affect the Silent Ringer too. The ringer control also signals the processing so that the processor might be able to selectively reject signals sensed by the microphone associated with the audible ringer.

Figure 9:
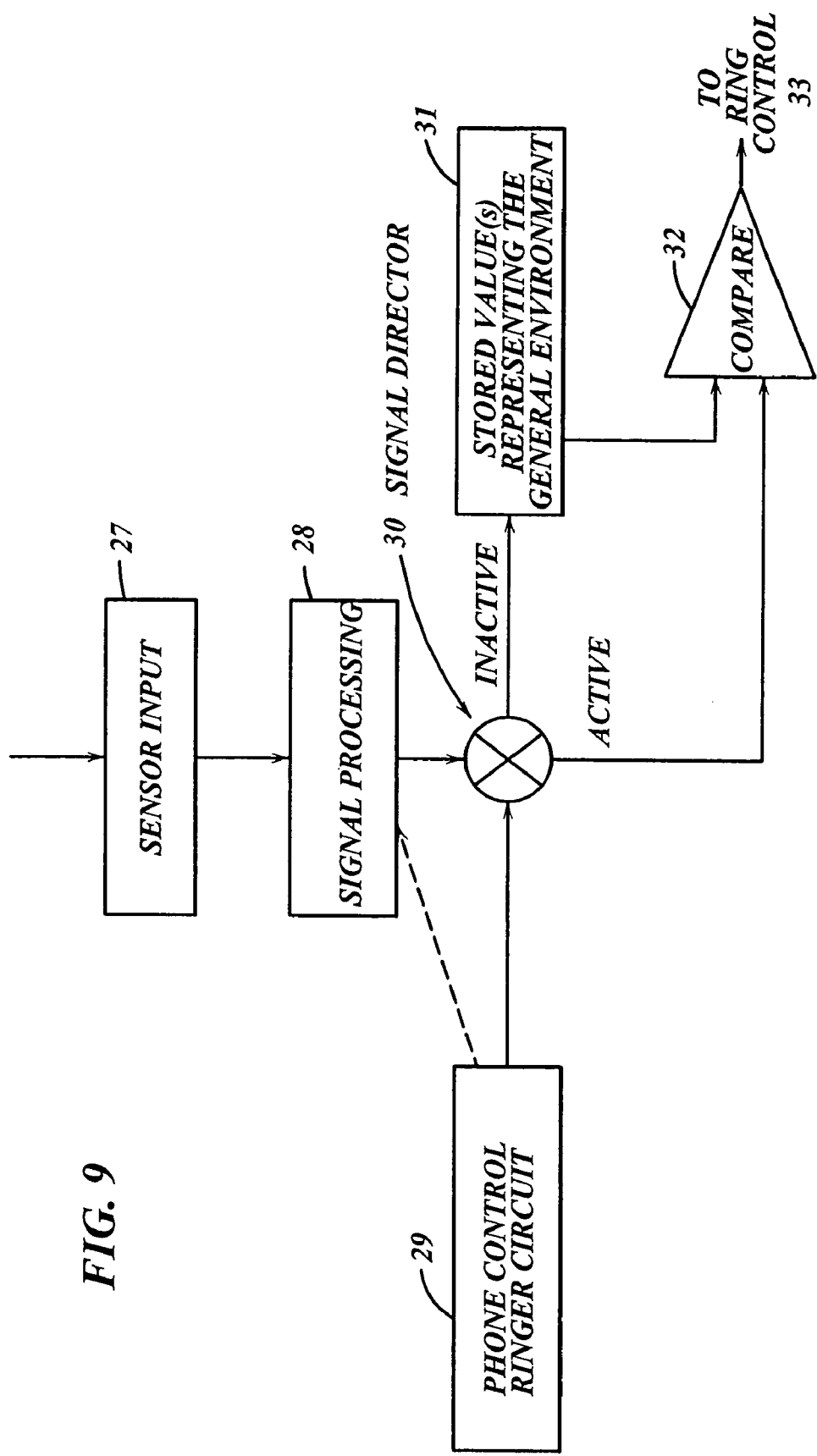
FIG. 9 shows a generalized sensor processing scheme including taking environmental reference level

The processing circuit (FIG. 9) takes the Sensor input 27 gets some Signal Processing 28, an input from the Phone Control Ringer Circuit 29 and indicate to the processing when to filter out signals associated with the ringer, audible and or silent. The ringer control circuit may also control a Signal Director 30. When the ringer is Inactive, the processed signal value is being Stored 31 as a representation of the general environment around the phone. When the ringer is Active the processed signal is directed to be Compared 32 to the Stored value to detect the user initiated ringer deactivation. When the comparison succeeds, an output 33 goes to the ringer control. By processing the signal from the sensor before ringing is initiated the detection of user action can be differentiated from the general environment around the phone. So even if the phone is in a handbag being carried, the jostling associated with that can be differentiated from user action after the ringing starts.

Once the user action has been detected, the device action may have selected from a number of options. In addition or alternative to silencing the alert, selections may include, terminating the call, initiating a preprogrammed response, or delaying when the alert will sound again.

The device may also be designed to detect a pattern of user interaction, such as multiple pats, or a series of pats in specific rhythms to initiate a range of programmed actions.

For example one pat might terminate the audible ringing, and a double pat might immediately transfer the call to voice mail.

Another application of a detected pattern of user interaction might be to initiate calls or other functions within the device. A user set pattern could be used to call home, or a pattern like the Morse Code SOS to call an emergency number. A pattern might also initiate some other function within the device such as a pause function on a device playing music.

The invention claimed is:

1. A communication device comprising
   a receiver for receiving a call signal from a remote source, said receiver including
   an audible ring generator for activating a ring signal responsive to the receipt of the call signal, and
   deactivation means for turning off an activated ring signal including,
      a microphone for receiving environmental noise,
      a signal generator for generating a struck signal when the received environmental noise corresponds to noise resulting from the striking of the communication device, and
      a processor for receiving a generated struck signal and for turning off the activated ring signal upon receiving a generated struck signal.

2. A communication device according to claim 1, wherein said communication device is a mobile phone.

3. A portable device comprising
   an audible alert generator for activating an alert signal to alert the user of some required action,
   deactivation means for turning off an activated alert signal including,
      a microphone for receiving environmental noise,
      a signal generator for generating a struck signal when the received environmental noise corresponds to noise resulting from the striking of the device, and
      a processor for receiving a generated struck signal and for turning off the activated alert signal upon receiving a generated struck signal.

4. A device according to claim 3, wherein the action taken after the contact has been detected is programmable.

5. A device according to claim 3, where there is a pattern of interaction from the user to select a programmable action by the device.

6. A device according to claim 3, wherein said communication device is a mobile phone.

7. A device according to claim 3, wherein said device is a personal digital assistant (PDA).

8. A device according to claim 3, wherein said device is a personal mobile device.

* * * * *